(12) United States Patent
Roberts (10) Patent No.: US 11,015,711 B2
(45) Date of Patent: May 25, 2021

(54) LAYERED HEAD GASKET AND METHOD

(71) Applicant: Raleigh Roberts, Virgie, KY (US)

(72) Inventor: Raleigh Roberts, Virgie, KY (US)

(*) Notice: Subject to any disclaimer, the term of this patent is extended or adjusted under 35 U.S.C. 154(b) by 41 days.

(21) Appl. No.: 15/922,909

(22) Filed: Mar. 15, 2018

(65) Prior Publication Data

US 2018/0274678 A1    Sep. 27, 2018

Related U.S. Application Data

(60) Provisional application No. 62/474,555, filed on Mar. 21, 2017.

(51) Int. Cl.
| | |
|---|---|
| *F16J 15/08* | (2006.01) |
| *B32B 15/04* | (2006.01) |
| *B32B 15/01* | (2006.01) |
| *B32B 3/26* | (2006.01) |
| *B32B 15/20* | (2006.01) |
| *B32B 15/18* | (2006.01) |
| *F02F 11/00* | (2006.01) |

(52) U.S. Cl.
CPC ........... *F16J 15/0825* (2013.01); *B32B 3/266* (2013.01); *B32B 15/015* (2013.01); *B32B 15/043* (2013.01); *B32B 15/18* (2013.01); *B32B 15/20* (2013.01); *B32B 2255/06* (2013.01); *B32B 2255/26* (2013.01); *B32B 2581/00* (2013.01); *F02F 11/002* (2013.01); *F16J 15/0831* (2013.01); *F16J 2015/085* (2013.01); *F16J 2015/0837* (2013.01); *F16J 2015/0843* (2013.01); *F16J 2015/0856* (2013.01)

(58) Field of Classification Search
CPC ............. F16J 15/0831; F16J 2015/0837; F16J 2015/0843; F16J 15/0825; F16J 15/085; F16J 15/0856; F16J 2015/085; F16J 2015/0856; F16J 2015/0831; B32B 2255/06; B32B 2255/26; B32B 2255/00
See application file for complete search history.

(56) References Cited

U.S. PATENT DOCUMENTS

| | | | | |
|---|---|---|---|---|
| 1,982,759 | A | * 12/1934 | Rosen | F16J 15/128 |
| | | | | 277/597 |
| 2,089,254 | A | * 8/1937 | Fitzgerald | F16J 15/0831 |
| | | | | 428/137 |
| 2,134,868 | A | * 11/1938 | Fitzgerald | F16J 15/0818 |
| | | | | 277/599 |

(Continued)

*Primary Examiner* — Kristina R Fulton
*Assistant Examiner* — L. Susmitha Koneru
(74) *Attorney, Agent, or Firm* — Runyan Law; Charles Runyan (57) ABSTRACT

A layered head gasket includes a gasket core, a head-layer, a block-layer, and a plurality of apertures. The head gasket may be useful for sealing an internal combustion engine having a cylinder head, a cylinder block, a plurality of combustion chamber passageways, a plurality of coolant passageways, and a plurality of oil passageways. The gasket core is made of a copper sheet. The head-layer may be made of spring steel and may be fixed to a top side of the gasket core, being configured to interface with the cylinder head. Likewise, the block-layer may be made of spring steel and may be fixed to a bottom side of the gasket core, being configured to interface with the cylinder block. The plurality of apertures may pass through the head-layer, the gasket core, and the block-layer.

15 Claims, 5 Drawing Sheets

(56) References Cited

U.S. PATENT DOCUMENTS

| | | | | |
|---|---|---|---|---|
| 4,335,890 | A | * | 6/1982 | Nicholson ............ F16J 15/0825 |
| | | | | 277/595 |
| 5,255,926 | A | * | 10/1993 | Udagawa ............. F16J 15/0825 |
| | | | | 277/595 |
| 5,306,023 | A | * | 4/1994 | Udagawa ............. F16J 15/0825 |
| | | | | 277/601 |
| 5,460,387 | A | * | 10/1995 | Miyaoh ................. F02F 11/002 |
| | | | | 277/601 |
| 5,505,466 | A | * | 4/1996 | Willis .................... F02F 11/002 |
| | | | | 277/593 |
| 5,522,604 | A | * | 6/1996 | Weiss ................... F16J 15/0825 |
| | | | | 277/594 |
| 5,560,623 | A | * | 10/1996 | Yoshino ............... F16J 15/0825 |
| | | | | 277/595 |
| 6,685,197 | B1 | * | 2/2004 | Rakauskas ............. F16J 15/122 |
| | | | | 277/592 |
| 8,267,407 | B2 | * | 9/2012 | Schmucker .......... F16J 15/0825 |
| | | | | 277/593 |
| 2003/0155720 | A1 | * | 8/2003 | Inciong ............... F16J 15/0825 |
| | | | | 277/592 |
| 2005/0134006 | A1 | * | 6/2005 | Adams ................. F16J 15/0825 |
| | | | | 277/601 |
| 2007/0262534 | A1 | * | 11/2007 | Hunter .................. F02F 11/002 |
| | | | | 277/592 |
| 2010/0207334 | A1 | * | 8/2010 | Virgin ....................... B32B 3/08 |
| | | | | 277/654 |

* cited by examiner

LAYERED HEAD GASKET AND METHOD

CROSS-REFERENCE TO RELATED APPLICATION(S)

The present application is related to and claims priority to U.S. Provisional Patent Application No. 62/474,555 filed Mar. 21, 2017, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of internal combustion engines and accessories of existing art and more specifically relates to a gasket.

RELATED ART

Internal combustion engines use the expansion of combusted gasses to direct mechanical force to a component of a machine. This is usually accomplished by burning an air-fuel mixture against a movable piston, generating high temperatures and pressures within a combustion chamber. In order to maintain such a machine in operating condition, the combustion chamber must be kept sufficiently sealed to maintain pressure until a piston cycle is completed. Because internal combustion engines are complicated devices with many fixed and moving parts, many such seals are required. However, the most important seal for maintaining combustion chamber pressure usually occurs between the cylinder block of the engine, where the piston travels, and a cylinder head, which caps the top of the combustion chamber. This seal is usually formed by what is known as a head gasket. Unfortunately, many head gaskets suffer from longevity problems, and are a common maintenance item as leaks form or the gasket is blown out by combustion chamber pressure. In addition, many installations of new head gaskets fail because the new head gasket does not sufficiently seal the space between the cylinder block and the cylinder head. A suitable solution is desired.

U.S. Pat. No. 8,267,407 to Frank Schmucker relates to a cylinder head gasket. The described cylinder head gasket includes a gasket plate comprising a plurality of sheet metal layers and at least one combustion chamber opening, an inner layer being arranged in the gasket plate directly between two functional layers having sealing beads arranged one over the other, which enclose the combustion chamber opening and have bead feet lying in the planes of the functional layers and bead crests with which sealing beads of the two functional layers all project over the functional layers in a first direction extending perpendicularly to the gasket plane.

SUMMARY OF THE INVENTION

In view of the foregoing disadvantages inherent in the known gasket art, the present disclosure provides a novel layered head gasket and method. The general purpose of the present disclosure, which will be described subsequently in greater detail, is to provide a head gasket capable of more effectively sealing a cylinder head to a cylinder block.

A layered head gasket is disclosed herein. The layered head gasket includes a gasket core, a head-layer, a block-layer, and a plurality of apertures. The head gasket may be useful for sealing an internal combustion engine having a cylinder head, a cylinder block, a plurality of combustion chamber passageways, a plurality of coolant passageways, and a plurality of oil passageways. The gasket core is made of a copper sheet. The head-layer may be made of spring steel and may be fixed to a top side of the gasket core, being configured to interface with the cylinder head. Likewise, the block-layer may be made of spring steel and may be fixed to a bottom side of the gasket core, being configured to interface with the cylinder block. The plurality of apertures may pass through the head-layer, the gasket core, and the block-layer. The plurality of apertures may be dimensioned to match and align with the plurality of combustion chamber passageways, the plurality of coolant passageways, and the plurality of oil passageways of the internal combustion engine when the head gasket is installed between the cylinder head and the cylinder block, such that the fluids circulating throughout the internal combustion engine are not impeded by the head gasket.

According to another embodiment, a method/means for sealing a cylinder block to a cylinder head is also disclosed herein. The method for sealing a cylinder block to a cylinder head includes firstly, providing the described head gasket; secondly, stamping the head gasket under pressure during a manufacture process, such that the head-layer and the block-layer are sealed to the gasket core; thirdly, placing the head gasket on the cylinder block; fourthly, setting the cylinder head on the head gasket opposite to the cylinder block; fifthly, affixing the cylinder head to the cylinder block, such that the head gasket is compressed between the cylinder head and cylinder block, enabling the head-layer of the head gasket to seal to the cylinder head, and the block-layer of the head gasket to seal to the cylinder block; and sixthly and optionally, containing a cylinder combustion within the cylinder head, the cylinder block, and the head gasket.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a layered head gasket and method, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to a gasket and more particularly to a layered head gasket and method as used to improve the sealing of a cylinder head to a cylinder block.

Generally, the layered head gasket includes a head gasket having features making it more suitable for conforming to the cylinder block and cylinder head of an internal combustion engine, thereby improving sealing characteristics between the cylinder block and cylinder head. The head gasket utilizes the advantageous characteristics of both copper and steel, having a copper core to increase malleability and sealing ability while using steel reinforcements for strength and durability. In particular, one steel layer may be affixed on the head side of the copper core, and another steel layer may be affixed to the block side of the copper core. In addition, flanges may reinforce the interior of the gasket apertures and the exterior edges of the gasket. Various types of external coatings, including but not limited to TEFLON and silicone, may be applied to the exterior of the head gasket. The head gaskets may be configured for a variety of internal engines having differing numbers of combustion chambers, varying types of oil and coolant passageways, or various cylinder head surface shapes.

Referring now more specifically to the drawings by numerals of reference, there is shown in FIGS. 1-4, various views of a head gasket 100.

Figure 1:
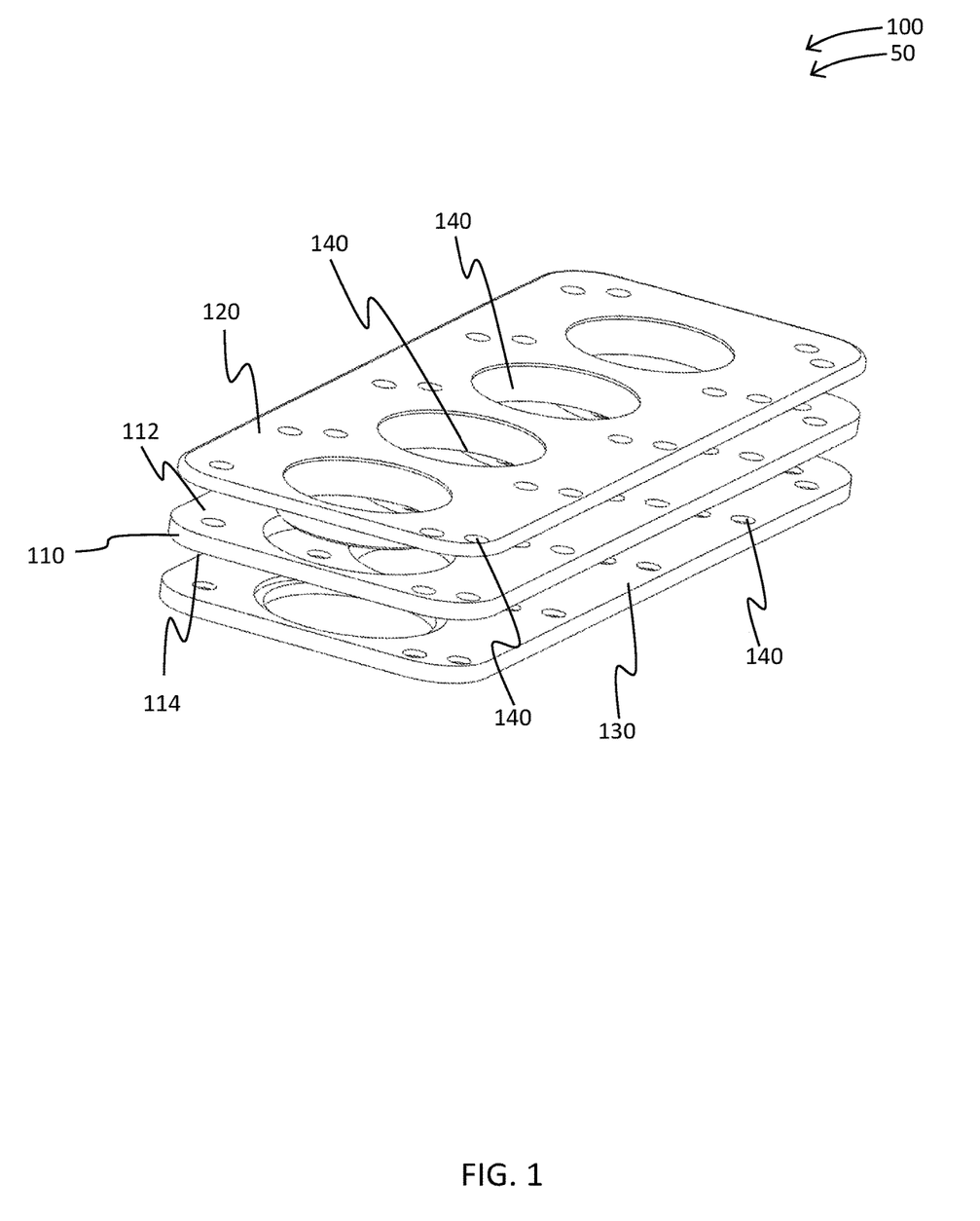
FIG. 1 is an exploded view of the layered head gasket according to an embodiment of the disclosure.

FIG. 1 shows a head gasket 100 during an 'in-use' condition 50, according to an embodiment of the present disclosure. Here, head-gasket 100 may be beneficial for use by a user 40 to effectively seal a cylinder block to a cylinder head. As illustrated, head-gasket 100 may include gasket core 110, head-layer 120, and block-layer 130. Gasket core 110 may be constructed from a copper sheet. Gasket core 110 may comprise a perforated sheet measuring between twenty and sixty thousandths of an inch thick. Head-layer 120 may be constructed of spring steel and may be fixed to top side 112 of gasket core 110, and may be ten-thousandths of an inch thick. Likewise, block-layer 130 may be constructed of spring steel but may be fixed to bottom side 114 of gasket core 110, and may also be ten-thousandths of an inch thick. Plurality of apertures 140 may pass through gasket core 110, head-layer 120, and block-layer 130. Preferably, head-layer 120 and block-layer 130 are constructed of stainless steel. Gasket core 110 may be compressed between head-layer 120 and block-layer 130 during manufacturing, such that gasket core 110 is effectively sealed to head-layer 120 and block-layer 130. Upon reading this specification, it should be appreciated that, under appropriate circumstances, considering such issues as user preferences, design preference, structural requirements, marketing preferences, cost, available materials, technological advances, etc., other structural arrangements such as, for example, various aperture arrangements, differing gasket shapes, different materials used, etc., may be sufficient. Further, those with ordinary skill in the art will now appreciate that upon reading this specification and by their understanding the art of internal combustion engine assembly as described herein, methods of sealing a cylinder head to a cylinder block will be understood by those knowledgeable in such art.

Figure 2:
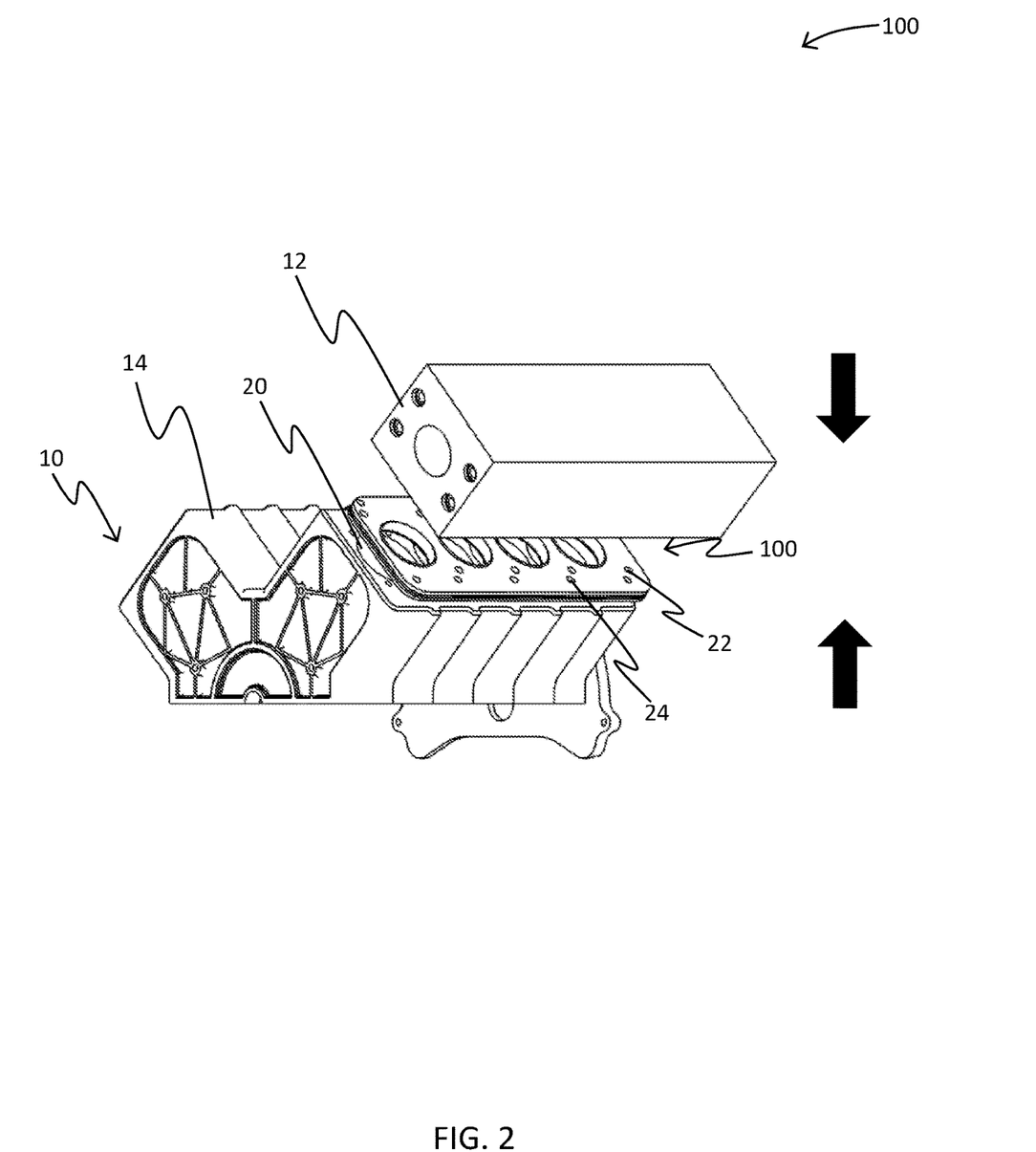
FIG. 2 is a perspective view of the layered head gasket and the internal combustion engine of FIG. 1, according to an embodiment of the present disclosure.

Referring now to FIG. 2 showing head-gasket 100 of FIG. 1, according to an embodiment of the present disclosure. Head-gasket 100 may be useful sealing cylinder head 12 of internal combustion engine 10 to cylinder block 14 of internal combustion engine 10. Cylinder block 14 and cylinder head 12 may have plurality of combustion chamber passageways 20, plurality of coolant passageways 22, and plurality of oil passageways 24. Head-layer 120 (FIG. 1) of head gasket 100 may be configured to interface with cylinder head 12. Likewise, block-layer 130 (FIG. 1) of head gasket 100 may be configured to interface with cylinder-block 14. Plurality of apertures 140 (FIG. 1) of head gasket 100 may be sized and dimensioned to match and align with plurality of combustion chamber passageways 20, plurality of coolant passageways 22, and plurality of oil passageways 24 when head-gasket 100 is installed between cylinder head 12 and cylinder block 14.

Figure 3:
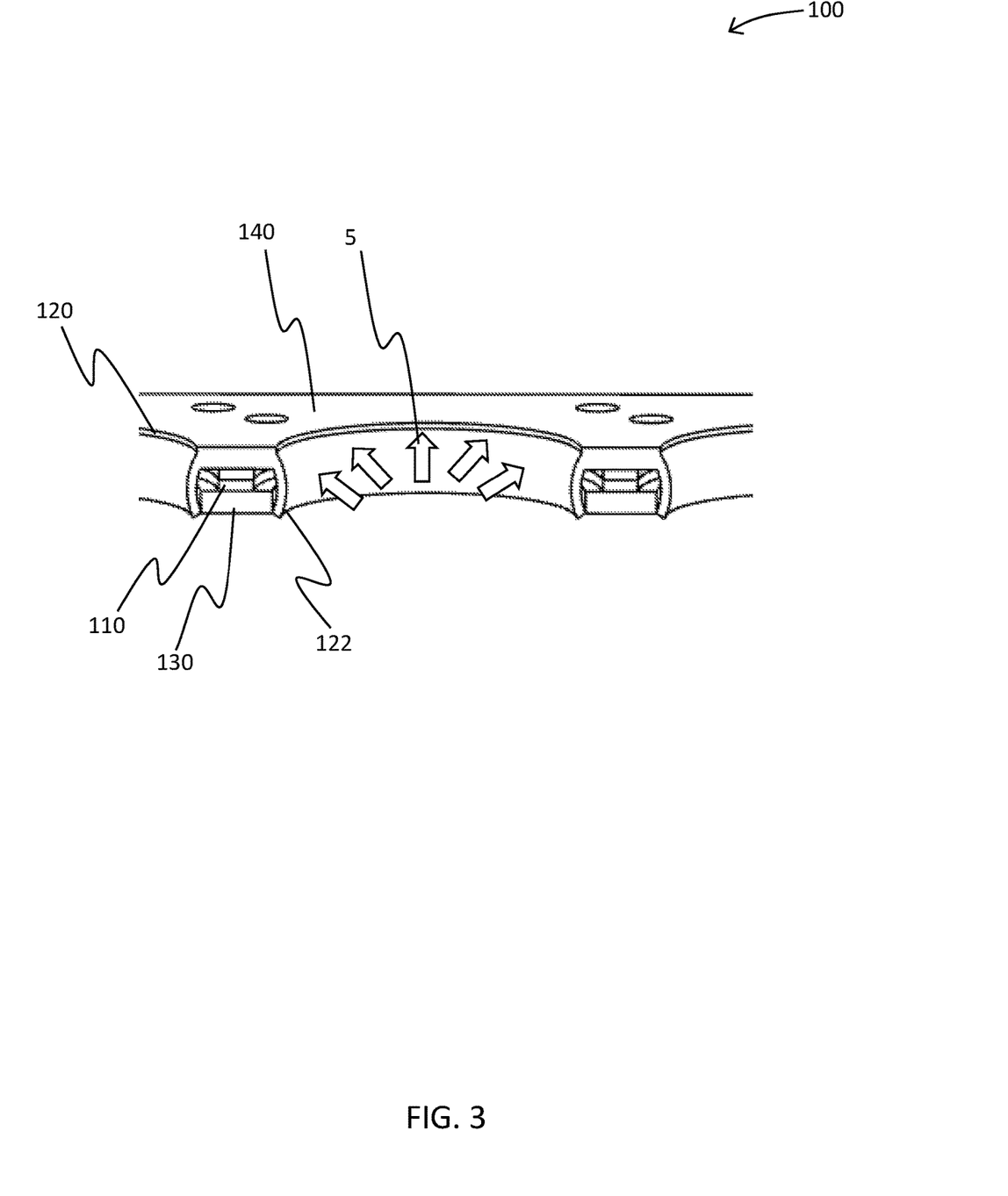
FIG. 3 is a cutaway view of the layered head gasket of FIG. 1, according to an embodiment of the present disclosure.

FIG. 3 is a cutaway view of the layered head gasket 100 of FIG. 1, according to an embodiment of the present disclosure. Head gasket 100 may further include plurality of aperture-flanges 122 integrated with head-layer 120 and alternatively block-layer 130. Plurality of aperture-flanges 122 may circumscribe plurality of apertures 140, plurality of aperture-flanges 122 being compressed against plurality of apertures 140, reinforcing gasket core 110 against pressure 5 generated within plurality of combustion chamber passageways 20, plurality of coolant passageways 22, and plurality of oil passageways 24. Aperture-flanges 122 may affix head-layer 120 to block-layer 130 by being compressed around gasket-core 110, head-layer 120, and block-layer 130 in a stamping press during a manufacturing process, such that plurality of aperture-flanges 122 encloses gasket core 110, head-layer 120, and block-layer 130. Plurality of aperture-flanges 122 may contact cylinder head 12 (FIG. 2) and cylinder block 14 (FIG. 2) when installed in order to isolate gasket core 110 from plurality of combustion chamber passageways 20 (FIG. 2), plurality of coolant passageways 22 (FIG. 2), and plurality of oil passageways 24 (FIG. 2), plurality of aperture-flanges 122 being compressed into a sealed state against gasket core 110.

Figure 4:
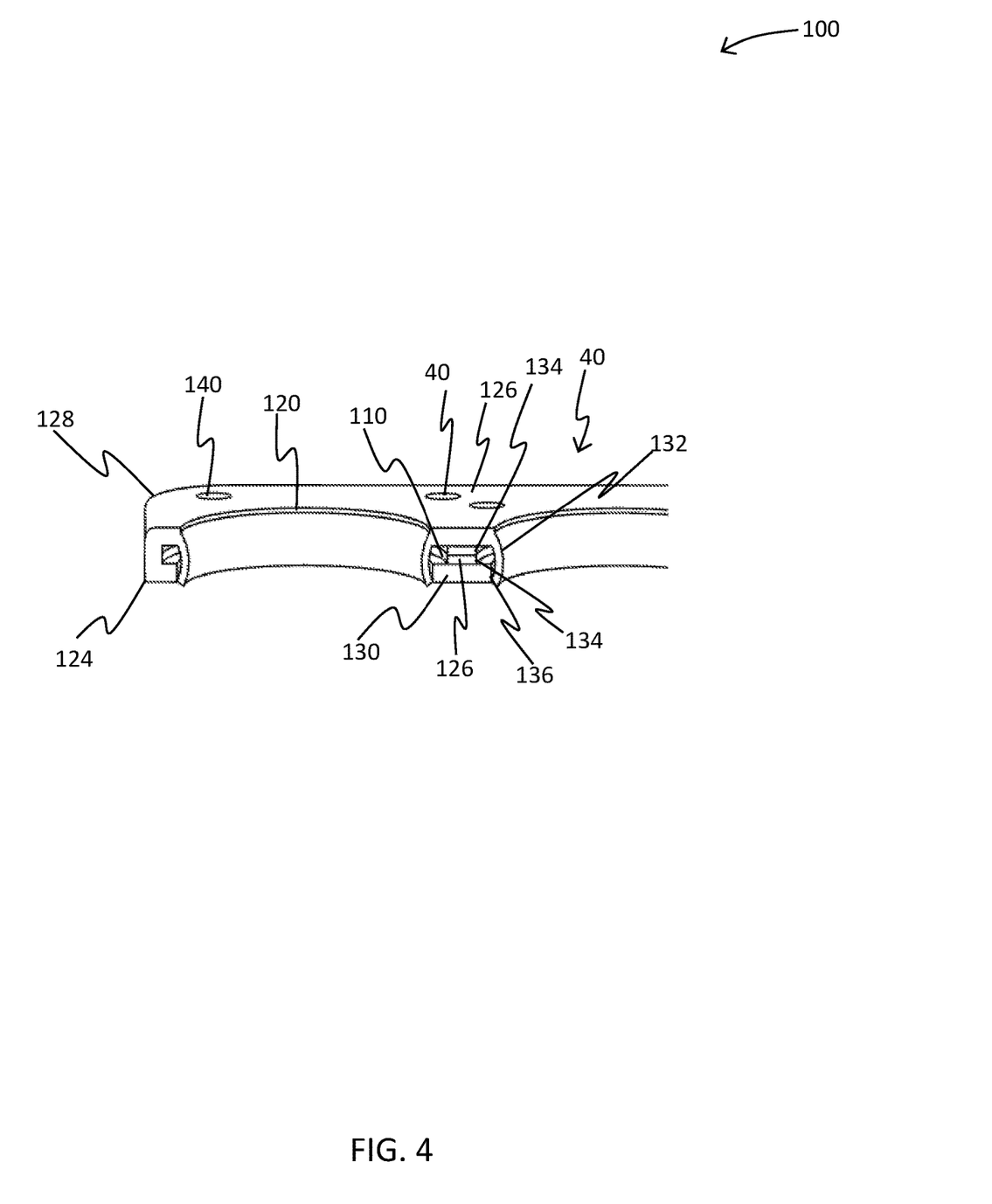
FIG. 4 is a cutaway view of the layered head gasket of FIG. 1, according to an embodiment of the present disclosure.

Referring now to FIG. 4, a cutaway view of the layered head gasket 100 of FIG. 1, according to an embodiment of the present disclosure. Head-layer 120 may be formed as perforated sheet 126 having a sheet thickness of approximately ten thousandths of an inch. Block-layer 130 may likewise be formed as perforated sheet 126 having a sheet thickness of approximately ten thousandths of an inch. Some embodiments may include varying thicknesses of head-layer 120 and block-layer 130. Gasket core 110 may also be formed as perforated sheet 126 having a sheet thickness of approximately twenty thousandths of an inch, and alternatively approximately forty thousandths of an inch in preferred embodiments. Head gasket 100 may further include plurality of edge-flanges 124 integrated with head-layer 120 and alternatively block-layer 130, plurality of edge-flanges 124 circumscribing an outer perimeter of head-gasket 100, plurality of edge-flanges 124 being configured to effectively mechanically join gasket core 110, head-layer 120, and block-layer 130. Head gasket 100 may further include exterior coating 142 containing TEFLON and alternatively silicone. Plurality of edge-flanges 124 may be formed integrally into head-gasket 100 by pressing head-gasket 100 in a stamping press. Plurality of edge-flanges 124 may be configured to contact cylinder head 12 (FIG. 2) and cylinder block 14 (FIG. 2) when compressed; and wherein the plurality edge-flanges seal gasket core 110 from plurality of combustion chamber passageways 20 (FIG. 2), plurality of coolant passageways 22 (FIG. 2), and plurality of oil passageways 24 (FIG. 2) allowing necessary fluid communication to maintain internal combustion engine 10 in a sufficiently cooled state.

Figure 5:
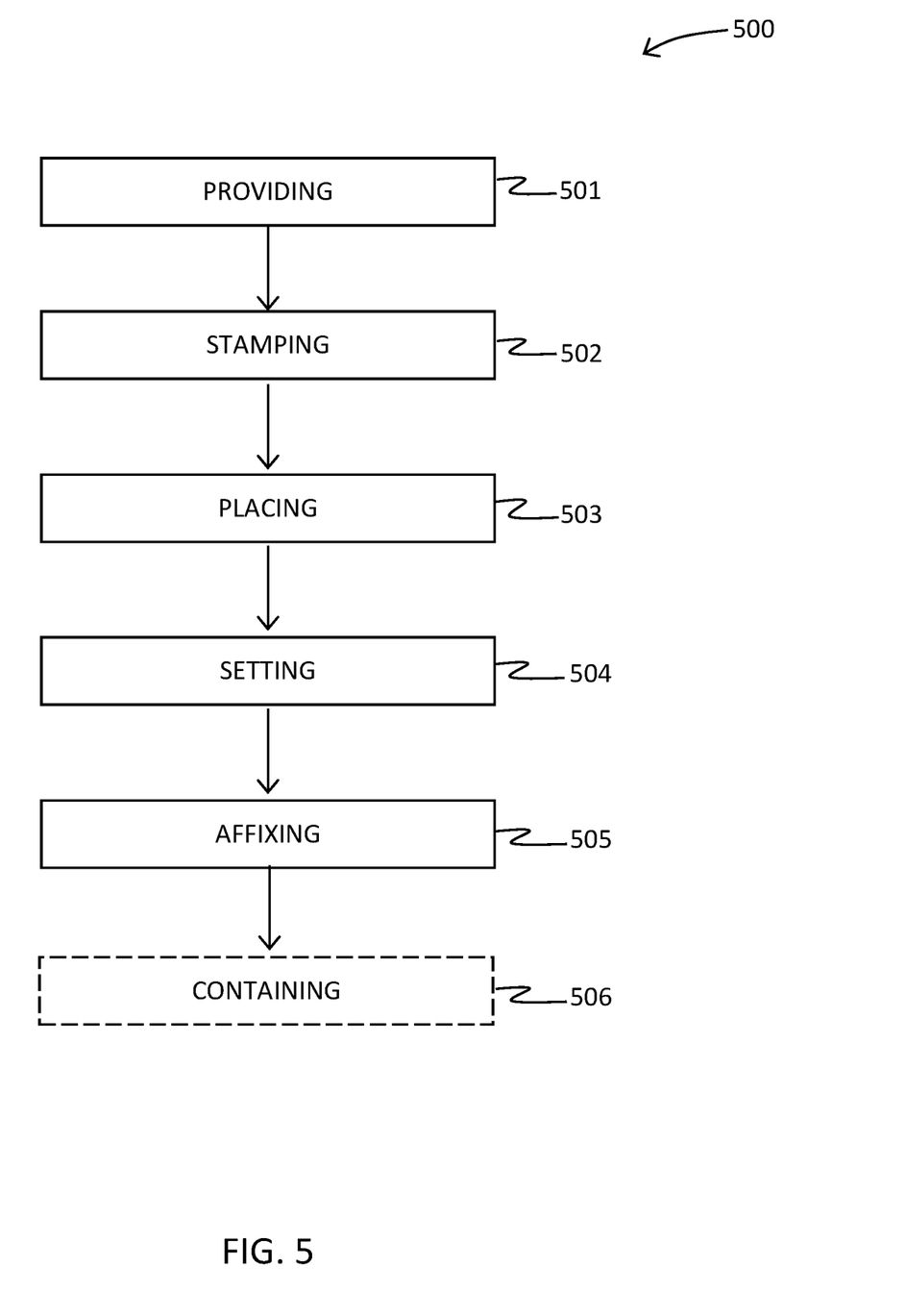
FIG. 5 is a flow diagram illustrating a method of use for sealing a cylinder head to a cylinder block using the present invention, according to an embodiment of the present disclosure.

FIG. 5 is a flow diagram illustrating a method for sealing a cylinder head to a cylinder block 500, according to an embodiment of the present disclosure. In particular, the method for sealing a cylinder head to a cylinder block 500 may include one or more components or features of the head gasket 100 as described above. As illustrated, the method for sealing a cylinder head to a cylinder block 500 may include the steps of: step one 501, providing a head gasket for an internal combustion engine having a cylinder head and a cylinder block, and between the cylinder head and a cylinder block a plurality of combustion chamber passageways, a plurality of coolant passageways, and a plurality of oil passageways, the head gasket comprising: a gasket core made of a copper sheet, a head-layer made of spring steel, the head-layer fixed to a top side of the gasket core and configured to interface with the cylinder head, and a block-layer made of spring steel, the block-layer fixed to bottom side of the gasket core and configured to interface with the block head, and wherein the head gasket includes a plurality of apertures passing through the head-layer, the gasket core, and the block-layer, the plurality of apertures being sized and dimensioned to match and align with the plurality of combustion chamber passageways, the plurality of coolant passageways, and the plurality of oil passageways when the head gasket is installed between the cylinder head and a cylinder block; step two 502, stamping the head gasket under pressure during a manufacture process, such that the head-layer and the block-layer are sealed to the gasket core; step three 503, placing the head gasket on the cylinder block; step four 504, setting the cylinder head on the head gasket opposite to the cylinder block; step five 505, affixing the cylinder head to the cylinder block, such that the head gasket is compressed between the cylinder head and cylinder block, enabling the head-layer of the head gasket to seal to the cylinder head, and the block-layer of the head gasket to seal to the cylinder block; and step six 506, containing a cylinder combustion within the cylinder head, the cylinder block, and the head gasket.

It should be noted that step 506 is an optional step and may not be implemented in all cases. Optional steps of method of use 500 are illustrated using dotted lines in FIG. 5 so as to distinguish them from the other steps of method of use 500. It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for sealing a cylinder head to a cylinder block, are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A head gasket for an internal combustion engine having a cylinder head and a cylinder block, and located through the cylinder head and the cylinder block a plurality of combustion chamber passageways, a plurality of coolant passageways, and a plurality of oil passageways, the head gasket comprising:
   a gasket core made of a copper sheet;
   a head-layer made of spring steel, the head-layer fixed to a top side of the gasket core and configured to interface with the cylinder head; and
   a block-layer made of spring steel, the block-layer fixed to a bottom side of the gasket core and configured to interface with the cylinder block; and
   a plurality of apertures passing through the head-layer, the gasket core, and the block-layer, the plurality of apertures being sized and dimensioned to match and align with the plurality of combustion chamber passageways, the plurality of coolant passageways, and the plurality of oil passageways when the head gasket is installed between the cylinder head and the cylinder block; and
   a plurality of aperture-flanges integrated with the head-layer and alternatively the block-layer, the plurality of aperture-flanges circumscribing the plurality of apertures, the plurality of aperture-flanges being compressed against the plurality of combustion chamber passageways in the head-layer and the block-layer, reinforcing the gasket core against a pressure generated within the plurality of combustion chamber passageways, the plurality of coolant passageways, and the plurality of oil passageways;
   a plurality of edge-flanges integrated with the head-layer and alternatively the block-layer, the plurality of edge-flanges circumscribing an outer perimeter of the head gasket, the plurality of edge-flanges being configured to effectively mechanically join the gasket core, the head-layer, and the block-layer;
   the plurality of aperture-flanges and the plurality of edge-flanges affixes the head-layer and the gasket core to the block-layer.

2. The head gasket of claim 1, wherein the head-layer is a perforated spring steel sheet having a sheet thickness of approximately ten thousandths of an inch.

3. The head gasket of claim 1, wherein the block-layer is a perforated spring steel sheet having a sheet thickness of approximately ten thousandths of an inch.

4. The head gasket of claim 1, wherein the gasket core is a perforated copper core having a sheet thickness of approximately no less than twenty thousandths of an inch.

5. The head gasket of claim 1, wherein the gasket core is a perforated copper core having a sheet thickness of approximately no more than sixty thousandths of an inch.

6. The head gasket of claim 1, wherein the plurality of aperture-flanges affix the head-layer to the block-layer, the plurality of aperture-flanges being compressed around the gasket-core, the head-layer, and the block-layer in a stamping press during a manufacturing process, such that the plurality of aperture-flanges encloses the gasket core, the head-layer, and the block-layer.

7. The head gasket of claim 1, wherein the plurality of aperture-flanges contacts the cylinder head and the cylinder block when installed in order to isolate the gasket core from the plurality of combustion chamber passageways, the plurality of coolant passageways, and the plurality of oil passageways, the plurality of aperture-flanges being compressed into a sealed state against the gasket core.

8. The head gasket of claim 1, wherein the plurality of edge-flanges is formed integrally into the head gasket by pressing the head gasket in a stamping press.

9. The head gasket of claim 1, wherein the plurality of edge-flanges is configured to contact the cylinder head and the cylinder block when compressed; and wherein the plurality edge-flanges seal the gasket core from the plurality of combustion chamber passageways, the plurality of coolant passageways, and the plurality of oil passageways allowing necessary fluid communication to maintain the internal combustion engine in a sufficiently cooled state.

10. The head gasket of claim 1, wherein the head-layer and the block-layer are made of stainless steel.

11. The head gasket of claim 1, wherein the gasket core is compressed between the head-layer and the block-layer during the manufacturing process, such that the gasket core is effectively sealed to the head-layer and the block-layer.

12. The head gasket of claim 1, further comprising an exterior coating of Teflon.

13. The head gasket of claim 1, further comprising an exterior coating of silicone.

14. A layered head gasket for an internal combustion engine having a cylinder head and a cylinder block, and located through the cylinder head and the cylinder block a plurality of combustion chamber passageways, a plurality of coolant passageways, and a plurality of oil passageways, the layered head gasket comprising:
   a gasket core made of a copper sheet;
   a head-layer made of spring steel, the head-layer fixed to a top side of the gasket core and configured to interface with the cylinder head; and
   a block-layer made of spring steel, the block-layer fixed to a bottom side of the gasket core and configured to interface with the cylinder block; and
   a plurality of apertures passing through the head-layer, the gasket core, and the block-layer, the plurality of apertures being sized and dimensioned to match and align with the plurality of combustion chamber passageways, the plurality of coolant passageways, and the plurality of
   oil passageways when the head gasket is installed between the cylinder head and the cylinder block;
   a plurality of aperture-flanges integrated with the head-layer and alternatively the block-layer, the plurality of aperture-flanges circumscribing the plurality of apertures, the plurality of aperture-flanges being compressed against the plurality of combustion chamber passageways in the head-layer and the block-layer, reinforcing the gasket core against a pressure generated within the plurality of combustion chamber passageways, the plurality of coolant passageways, and the plurality of oil passageways;
   the plurality of aperture-flanges and the plurality of edge-flanges affixes the head-layer and the gasket core to the block-layer;
   wherein the plurality of aperture-flanges affix the head-layer to the block-layer, the plurality of aperture-flanges being compressed around the gasket core, the head-layer, and the block-layer in a stamping press during a manufacturing process, such that the plurality of aperture-flanges encloses the gasket core, the head-layer, and the block-layer;
   wherein the plurality of aperture-flanges contacts the cylinder head and the cylinder block when installed in order to isolate the gasket core from the plurality of combustion chamber passageways, the plurality of coolant passageways, and the plurality of oil passageways, the plurality of aperture-flanges being compressed into a sealed state against the gasket core;
   further comprising a plurality of edge-flanges integrated with the head-layer and alternatively the block-layer, the plurality of edge-flanges circumscribing an outer perimeter of the head gasket, the plurality of edge-flanges being configured to effectively mechanically join the gasket core, the head-layer, and the block-layer;
   wherein the plurality of edge-flanges is formed integrally into the head gasket by pressing the head gasket in a stamping press;
   wherein the plurality of edge-flanges is configured to contact the cylinder head and the cylinder block when compressed; and wherein the plurality edge-flanges seal the gasket core from the plurality of combustion chamber passageways, the plurality of coolant passageways, and the plurality of oil passageways allowing necessary fluid communication to maintain the internal combustion engine in a sufficiently cooled state;
   wherein the head-layer and the block-layer are made of stainless steel; and
   wherein the gasket core is compressed between the head-layer and the block-layer during the manufacturing process, such that the gasket core is effectively sealed to the head-layer and the block-layer.

15. A method for sealing a cylinder block to a cylinder head, the method comprising the steps of:
   providing the gasket of claim 1;
   stamping the head gasket under pressure during a manufacture process, such that the head-layer and the block-layer are sealed to the gasket core;
   placing the head gasket on the cylinder block;
   setting the cylinder head on the head gasket opposite to the cylinder block; and
   affixing the cylinder head to the cylinder block, such that the head gasket is compressed between the cylinder head and cylinder block, enabling the head-layer of the head gasket to seal to the cylinder head, and the block-layer of the head gasket to seal to the cylinder block.

* * * * *